(No Model.)

H. B. CAMP.
CONDUIT FOR UNDERGROUND WIRES.

No. 414,970. Patented Nov. 12, 1889.

Witnesses:
C. E. Humphrey
Geo. Hemmer

Inventor:
Horace B. Camp,
by C. S. Humphrey
Atty.

UNITED STATES PATENT OFFICE.

HORACE B. CAMP, OF CUYAHOGA FALLS, OHIO.

CONDUIT FOR UNDERGROUND WIRES.

SPECIFICATION forming part of Letters Patent No. 414,970, dated November 12, 1889.

Application filed August 12, 1889. Serial No. 320,464. (No model.)

*To all whom it may concern:*

Be it known that I, HORACE B. CAMP, a citizen of the United States, residing at Cuyahoga Falls, in the county of Summit and State of Ohio, have invented a certain new and useful Improvement in Conduits for Underground Electric Wires, of which the following is a specification.

My invention has relation to improvements in that class of conduits for underground electric wires which consist of sections of pipe of earthenware, terra-cotta, or analogous material divided into compartments by longitudinal partitions.

The objects of my invention are to simplify the construction, to provide means for replacing any partition if broken, and to provide means for more securely uniting the sections together and strengthening the joints.

To these objects my invention consists in the peculiar construction and arrangement of parts hereinafter described, and then specifically pointed out in the claims, reference being had to the accompanying drawings, forming a part of this specification.

Figure 1:
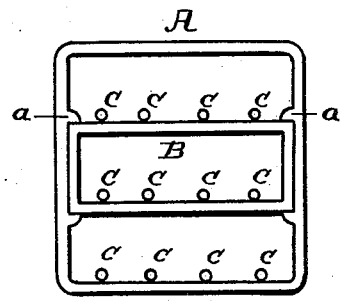
Figure 2:
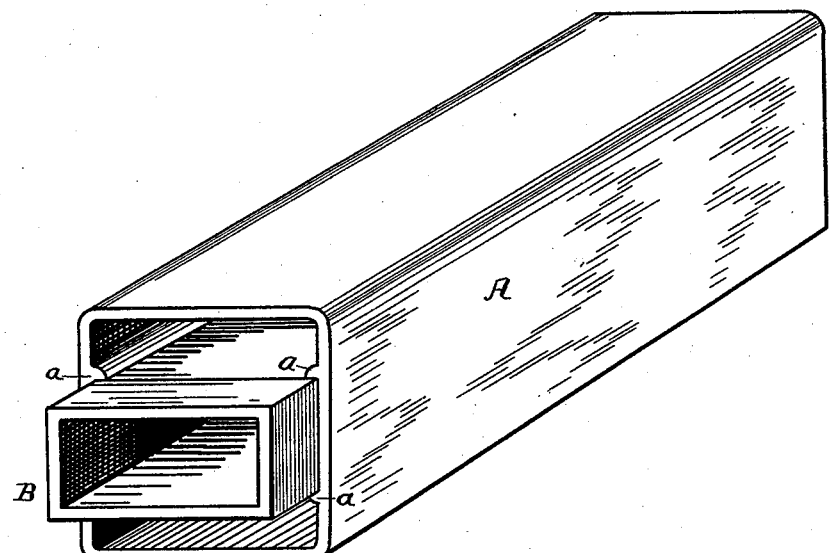

In the accompanying drawings, in which similar letters of reference indicate like parts, Figure 1 is an end elevation of a section of my improved conduit, showing electric-wire cables therein; and Fig. 2, a perspective of the same.

In the drawings, A is a section of stoneware-pipe rectangular in cross-section, having on the inner face of each of two opposite sides two longitudinal parallel ridges $a$ $a$ $a$ $a$, made integral with the pipe, which constitute guides for the inner pipe B. These pipes are made separately in an ordinary sewer-pipe press, and as they contain no internal partition the mechanism for their construction is simple and their manufacture easy. After being made they are preferably vitrified in burning to enable them the better to resist moisture.

In use the smaller pipe is inserted between the guides of the larger, thereby affording two partitions in the larger, as shown, for the support of the wire cables. In case the smaller pipe becomes broken, it can readily be replaced by another without loss of the larger pipe, which could not be done if the partitions were integral with the pipe.

In laying the pipe in the ground the smaller pipe is preferably inserted half-way into two adjacent large pipes, breaking joints with them. Thereby a firm support for the joint between the large pipes is afforded in addition to the outside coupling to prevent sagging of the joint from unequal density of the earth below or the pressure from the earth above.

It is obvious that more ridges $a$ and pipe B may be added, if desired, to increase the capacity of the conduit, and it is not essential that the pipe be rectangular in cross-section, as it may be round or polygonal, as desired.

I claim—

1. The combination of a larger and a smaller section of pipe, the smaller adapted to enter the larger pipe, the larger pipe provided with internal ridges to support said smaller pipe, substantially as shown and described.

2. The combination of two sections of pipe, one pipe being less in diameter in one direction than the internal diameter of the other and adapted to enter said larger pipe, and ridges integral with said larger pipe to support said smaller pipe, substantially as shown and described.

In testimony that I claim the above I hereunto set my hand.

HORACE B. CAMP.

In presence of—
C. P. HUMPHREY,
C. E. HUMPHREY.